Jan. 12, 1932. A. BJORN 1,840,931
PHOTOGRAPHIC LENS AND METHOD OF APPLYING THE SAME
Filed Oct. 1, 1930 2 Sheets-Sheet 1

INVENTOR
Aleth Bjorn
BY
his ATTORNEY

Jan. 12, 1932.  A. BJORN  1,840,931
PHOTOGRAPHIC LENS AND METHOD OF APPLYING THE SAME
Filed Oct. 1, 1930   2 Sheets-Sheet 2
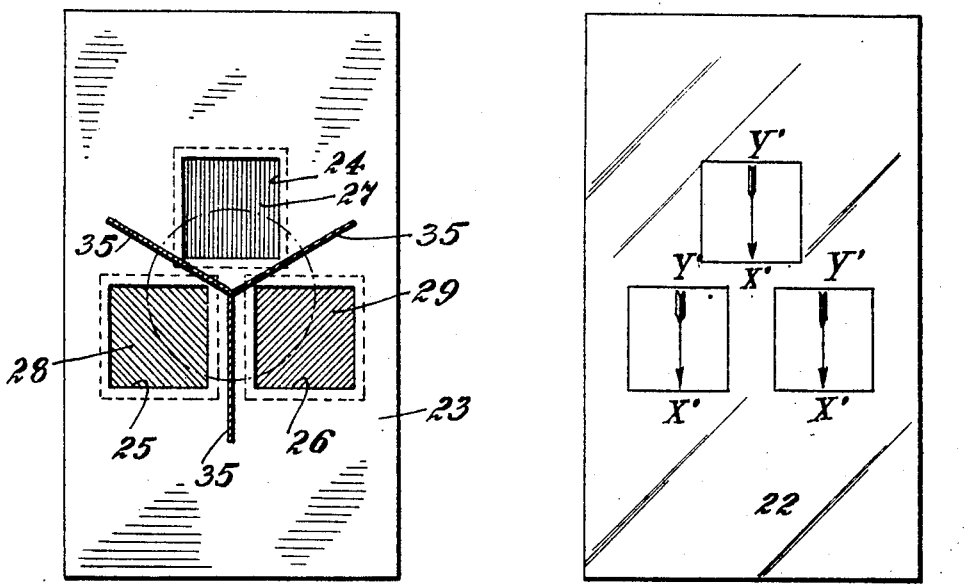
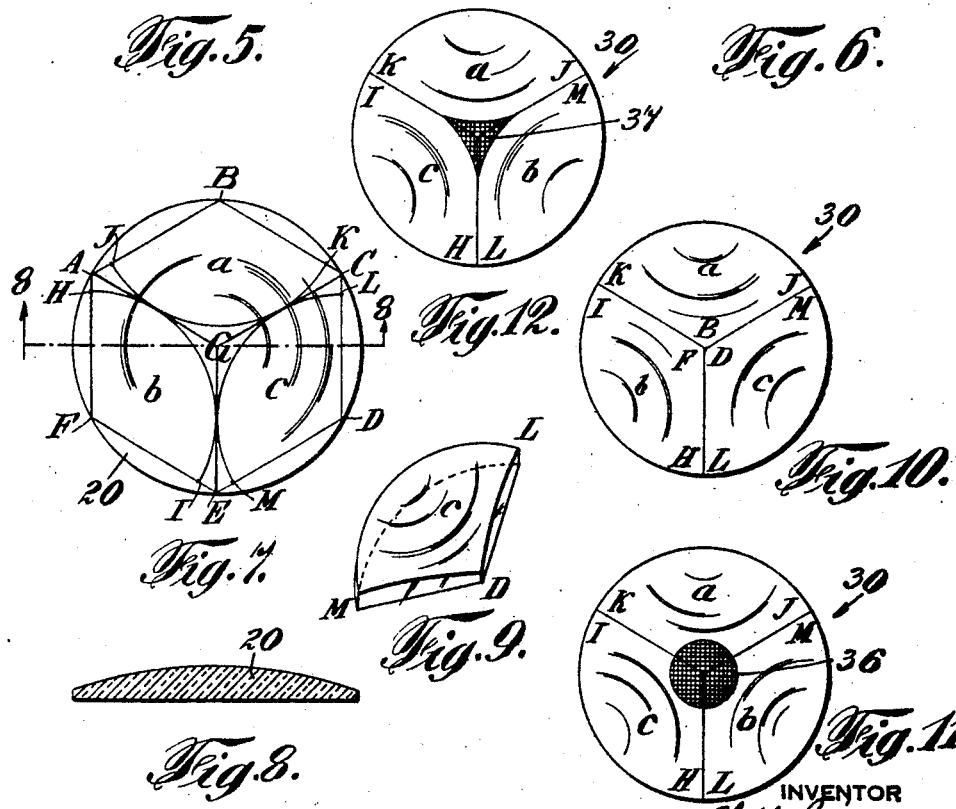

Patented Jan. 12, 1932

1,840,931

UNITED STATES PATENT OFFICE

ALETH BJORN, OF BROOKLYN, NEW YORK, ASSIGNOR TO NELSON L. WHITAKER, OF FULTON, NEW YORK, AND ROBERT S. AMENT, OF NEW YORK, N. Y.

PHOTOGRAPHIC LENS AND METHOD OF APPLYING THE SAME

Application filed October 1, 1930. Serial No. 485,606.

My invention relates to photographic lenses and methods for employing the same and refers particularly to lenses having the property of making a plurality of photographic images of the same subject simultaneously and means whereby this property of my lenses may be employed for the taking of photographs capable of projection upon a screen in the original colors of the subject photographed.

It is known that light may be separated into its actinic, or chromatic, rays and attempts have been made to apply this fact for the production of photographs which will possess the color values of the subject photographed.

Attempts have also been made to adapt this principle for the production of projected images upon a screen, in which the projected images will possess the color values of the subject photographed.

My invention relates to lenses which have the property of making simultaneously a plurality of photographic images of the same subject, and means whereby this property of my lenses may be adapted for the production of photographic images which can be converged by projection to a common image upon a screen, the visual image thus produced possessing the color values of the subject photographed.

The advantages in time, labor and accuracy of results of a process for taking photographs for the purposes mentioned in which all of the necessary photographic images are made simultaneously through a single lens upon a single photographic plate, or film, over a process requiring a number of lenses and a single, or number of, plates, or films, is evident to every one conversant with the art, and hence my invention which accomplishes these desired results, is of the greatest value.

The faces of the lenses of my invention, to which I refer as compounded lenses, are not of regular curvature, that is not entirely concave or convex; but, are of such curvature that a plurality of photographic images simultaneously results upon proper exposure of one of the lenses in a camera, which images can be impressed upon a single photographic film or plate, or can be impressed upon separate photographic films or plates.

While this property of my lenses to make a plurality of ordinary photographs is valuable, the process of my invention enables me to produce highly accurate colored pictorial reproductions of the subject photographed, and my lenses thus employed are, therefore, of the greater value in the production of still, or motion pictures for screen production.

A clear understanding of the construction and value of one of my lenses and of the process and value of my methods of applying my lenses can be obtained from the following description of one form of my lenses and its method of application for the production of photographic images capable of accurate colored projected pictures upon a screen.

In the accompanying drawings illustrating one form of the device of my invention and a method of its use, similar parts are designated by similar numerals.

Figure 5 is a section through the line 5—5 of Figure 1.

Figure 6 is a face view of a film, or plate, illustrating the positions of the three photographic images made by the shown lens.

Figure 7 is a face view of a plane-convex lens showing means for producing my compounded lens.

Figure 8 is a section through the line 8—8 of Figure 7.

Figure 9 is a perspective view of one of the elements cut from the lens of Figure 7 for the production of my compounded lens.

Figure 10 is a face view of my compounded lens showing its method of assemblage from the elements of Figure 7.

Figure 11 is a face view of my compounded lens with its center portion blacked, or blanked out.

Figure 12 shows a modified form of blacking, or blanking out, the center portion of my compound lens.

Figure 1:
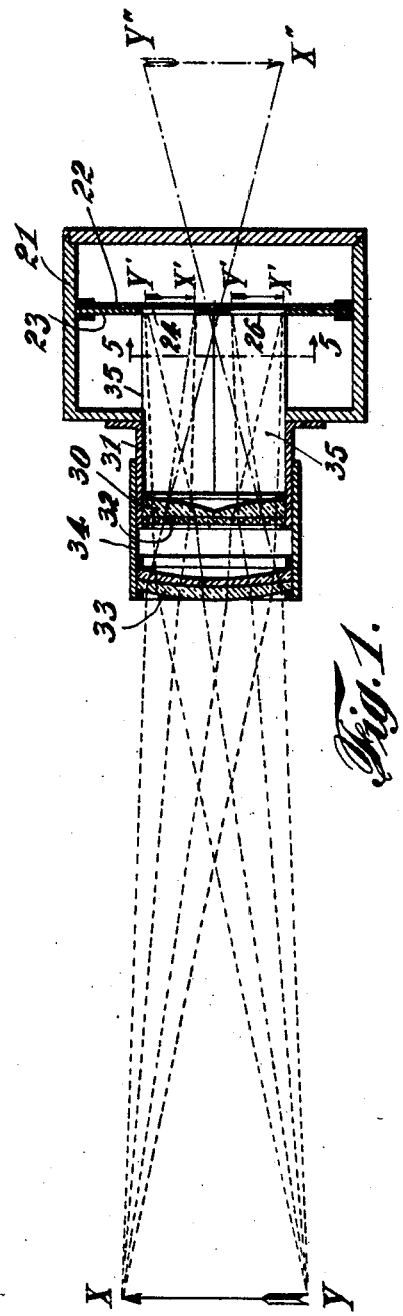
Figure 1 is a diagrammatic vertical section of a device carrying one form of the compounded lens of my invention taken on line 1—1 of Figure 2.

The particular form of the device of my invention shown in the accompanying drawings can be produced by a method disclosed in Figures 7 to 10 inclusive, this method being shown solely for purposes of clearly describing my optical device and in no way limiting the production of said device to the method disclosed.

A plane-convex lens 20 is cut into a hexagonal shape along the lines between the points A, B, C, D, E and F. The hexagonal lens thus formed is then cut into three equal parts through the lines AG, CG and EG.

The portion formed along the lines AG, GE, EF and FA is then cut along the arc HI with the point F as a center, forming the element $b$ of my device. The portion formed along the lines AG, GC, CB and BA is cut along the arc JK with the point B as a center, forming the element $a$ of my device. The portion formed along the lines CD, DE, EG and GC is cut along the arc LM forming the element $c$ of my device.

The three elements $a$, $b$ and $c$ are then positioned as shown in Figure 10 with their angular apexes B, D and F meeting in a common point which is the center of my compounded lens. It will be noted that the thicker portions of the lens elements are thus positioned at the periphery of my optical device, while the thinner portions are at its center.

It is evident that the plane-convex lens shown in the drawings may be replaced by other forms, as double-convex, concave-convex, plane concave and by other forms suitable for a particular use.

Figure 4:
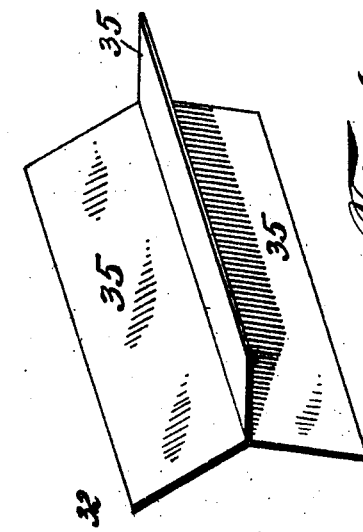
Figure 4 is a perspective view of the light separator of Figure 1.
Figure 3:
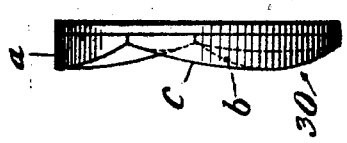
Figure 3 is an edge view of Figure 2.
Figure 2:
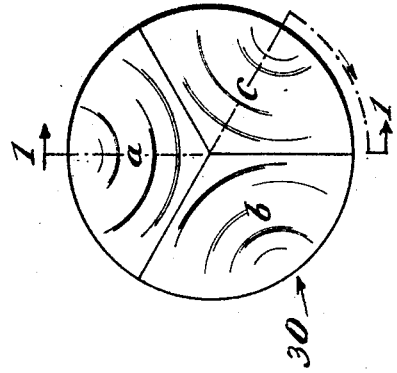
Figure 2 is a face view of the lens of Figure 1.

One particular method for employing a compounded lens of my invention is shown in Figures 1 to 6 inclusive, in which I use a plane-concave lens of the character described.

A camera casing 21 contains a photographic film, or plate, 22, in front of which is a filter screen 23; having three openings 24, 25 and 26 therein covered respectively by the red filter 27, the green filter 28 and the violet filter 29, the shades of which are adaptable for color photographic results.

My described compounded lens 30 is positioned within the extended portion 31 of the casing 21.

In order that the several elements of my lens may be in a perfect plane, I position them upon a plate of glass 32, to which it may be attached by means of an adhesive, such as Canada balsam, or by mechanical means.

A focussing lens combination 33 is carried by the telescopic member 34.

Positioned between the lens 30 and the filter screen 23 is a light separator composed of the three angularly positioned walls 35, 35, the end edges of the walls being in alignment with the connecting and abutting edges of the three elements of my compounded lens, the other end edges of the three walls separating the openings 24, 25, 26 of the filter screen as shown particularly in Figure 5.

The operation of the above described device is as follows; the arrow XY representing a subject to be photoghaphed: If my lens 30 is not present in the described device, the subject XY will be focussed at X"Y" as a single photographic image. If, however, my lens be incorporated in the device, there will result three separate and distinct photographed images X'Y', X'Y', X'Y' of the subject XY upon the film or plate, each one of which is the resultant effect of one of the lens sections of my compounded lens (Figure 6) and as each of these three protographic light rays passes through a different properly colored filter, three photographic impressions are produced, each being the result of the actinic rays of its individual color filter.

It is evident therefore, that if these three photographic impressions be transmitted in the usual manner through corresponding filters and converged into a single picture, there will be projected upon a screen a reproduction of the original subject in its original colors.

If desired, or necessary, the aberration sometimes incident to the thinner portion of a lens may be overcome by the blacked portion 36 of Figure 11, the blacked portion 37 of Figure 12 or by any other suitable means which may be carried by the lens or by the light separator.

It is evident that by omitting the color filter screen, three ordinary photographs of the same object can be produced simultaneously.

I do not limit myself to three lens elements in my compounded lens, as this number may be increased, or decreased if necessary in order to produce a desired number of photographic images.

By photographic plate or photographic film, I mean any substance or material carrying a light sensitized substance capable of receiving photographic impressions.

Neither do I limit myself to a stationary photographic film, or plate, as it is evident that my device can be employed with intermittently moving films for the production of a succession of photographs for motion pictures.

By irregular face of my lens, I mean a face which is not of single curvature, but which consists of a plurality of similar curvatures producing a face of compounded curvatures symmetrically arranged.

It will thus be seen that my invention presents a lens means whereby light may be separated into its component actinic rays, simultaneously producing a plurality of photographic images, each having the actinic values of a portion of such rays, the photographic images thus produced being capable of projection upon a screen to produce a composite representation of the original photographed subject in its original colors.

I do not limit myself to the particular size, shape, number or arrangement of parts, nor to their method of production and use, as shown and described, as these are given simply as a means for clearly describing my invention.

What I claim is:—

1. A photographic lens composed of a plurality of sections of an ordinary photographic lens, the central portions of said ordinary lens forming the periphery of said lens and capable of simultaneously producing a plurality of photographic images of the same subject.

2. A photographic lens having an irregular face and composed of a plurality of sections of an ordinary photographic lens, the central portions of said ordinary lens forming the periphery of said lens and capable of simultaneously producing a plurality of photographic images of the same subject.

3. A photographic lens composed of a plurality of sections of a plane-convex lens, the central portions of said plane-convex lens forming the periphery of said lens and capable of simultaneously producing a plurality of photographic images of the same subject.

4. A photographic lens composed of three similar sections of a plane-convex lens, the central portions of said plane-convex lens forming the periphery of said lens and capable of simultaneously producing three photographic images of the same subject.

5. A photographic lens having an irregularly curved face, said face being similar to that of a lens formed from a plurality of sections of a lens having a convex face with the thinner portions of the convex lens positioned centrally of said lens, said lens being capable of simultaneously producing a plurality of photographic images of the same subject.

Signed at New York city, in the county of New York and State of New York, this 26th day of September, 1930.

ALETH BJORN.